US008967763B2

(12) United States Patent
Kawate

(10) Patent No.: US 8,967,763 B2
(45) Date of Patent: Mar. 3, 2015

(54) LIQUID CONTAINING CHAMBER AND LIQUID EJECTING APPARATUS

(75) Inventor: Hiroyuki Kawate, Chino (JP)

(73) Assignee: Seiko Epson Corporation, Tokyo (JP)

(*) Notice: Subject to any disclaimer, the term of this patent is extended or adjusted under 35 U.S.C. 154(b) by 993 days.

(21) Appl. No.: 13/049,819

(22) Filed: Mar. 16, 2011

(65) Prior Publication Data

US 2011/0228629 A1 Sep. 22, 2011

(30) Foreign Application Priority Data

Mar. 17, 2010 (JP) ................................ 2010-060464

(51) Int. Cl.
*B01J 2/02* (2006.01)
*B41J 2/175* (2006.01)

(52) U.S. Cl.
CPC .................................. *B41J 2/17513* (2013.01)
USPC .................. 347/20; 347/82; 347/84; 347/85; 347/86; 347/87; 366/242; 366/244; 366/265; 366/270; 366/291; 366/292; 366/208; 366/209; 422/554

(58) Field of Classification Search
CPC ..... B41J 2/17503; B41J 2/1752; B01F 7/169; B01F 7/18; B01F 7/183; B01F 7/186; B01F 7/20; B01F 7/22
USPC ................ 366/102–103, 105, 187, 190, 198, 366/201–207, 222, 242, 244–245, 250, 265, 366/270, 290–291, 208–209; 422/501, 509, 422/521, 554; 347/20, 82, 84–87
See application file for complete search history.

(56) References Cited

U.S. PATENT DOCUMENTS

| | | | | |
|---|---|---|---|---|
| 7,618,133 | B2 * | 11/2009 | Kubo et al. | 347/85 |
| 7,618,136 | B2 | 11/2009 | Inoue et al. | |
| 7,708,394 | B2 * | 5/2010 | Kawamura et al. | 347/86 |
| 7,775,647 | B2 * | 8/2010 | Okito et al. | 347/86 |
| 7,883,193 | B2 * | 2/2011 | Okito et al. | 347/86 |
| 7,992,984 | B2 * | 8/2011 | Toba et al. | 347/86 |
| 8,388,122 | B2 | 3/2013 | Kawamura et al. | |
| 8,474,957 | B2 * | 7/2013 | Kubo et al. | 347/86 |
| 2006/0227181 | A1 * | 10/2006 | Umeda et al. | 347/84 |
| 2007/0052771 | A1 * | 3/2007 | Inoue et al. | 347/86 |
| 2013/0147884 | A1 * | 6/2013 | Kawamura et al. | 347/86 |

FOREIGN PATENT DOCUMENTS

| | | | |
|---|---|---|---|
| CN | 1935519 | A | 3/2007 |
| JP | 2002-205413 | A | 7/2002 |
| JP | 2006-044153 | A | 2/2006 |
| JP | 2006-188088 | A | 7/2006 |
| JP | 2007-062336 | A | 3/2007 |
| JP | 2007-230189 | A | 9/2007 |

* cited by examiner

*Primary Examiner* — Brian R Gordon
(74) *Attorney, Agent, or Firm* — Kilpatrick Townsend & Stockton LLP

(57) ABSTRACT

A liquid containing chamber that supplies liquid to a liquid ejecting apparatus includes a first liquid container that is capable of containing the liquid and has a vertically long shape in a mounted position when mounted in the liquid ejecting apparatus, a first projection provided in the first liquid container and a first stirring member supported by the first projection, wherein when the first liquid container in the mounted position is divided into an upper container which is located above the first projection and a lower container which is located below the upper container, the lower container contains the liquid and the upper container contains the liquid and a predetermined amount of air.

12 Claims, 12 Drawing Sheets

LIQUID CONTAINING CHAMBER AND LIQUID EJECTING APPARATUS

This application claims priority to Japanese Patent Application No. 2010-060464, filed Mar. 17, 2010, the entirety of which is incorporated by reference herein.

BACKGROUND

1. Technical Field

The present invention relates to liquid containing chambers that supply liquid to liquid ejecting apparatuses, and relates to liquid ejecting apparatuses.

2. Related Art

In liquid ejecting apparatuses such as ink jet recording apparatuses, ink jet textile printing apparatuses and microdispensers, a liquid such as ink is supplied from a liquid containing chamber that contains liquid, and then ejected. As an example of such a liquid which is contained in a containing chamber, pigment ink may be used. The pigment ink is manufactured by dispersing pigment particles in a dispersion medium. Therefore, pigment particles may settle over time, leading to variation in the concentration of the pigment ink.

JP-A-2006-188008 discloses a technique of reducing the variation in the concentration of the pigment ink, in which air is enclosed in a reservoir (also referred to as "liquid container") that contains the pigment ink, and then an ink cartridge is reciprocated so as to permit the movement of ink in the reservoir, thereby causing stirring of ink.

Further, JP-A-2007-230189 and JP-A-2006-44153 disclose a technique of reducing the variation in the concentration of the pigment ink, in which a stirring member and a support member for rotatably supporting the stirring member are provided, wherein ink is stirred by the stirring member.

However, when ink is stirred with air which is enclosed in the reservoir, the extent to which ink is moved by air (range of movement) is limited, therefore the pigment ink with the higher concentration, which is located vertically below and at the bottom of the reservoir, may not become stirred. Particularly, when the reservoir is elongated in the vertical direction, it is difficult to stir the pigment ink located at the bottom of the reservoir. On the other hand, when ink is stirred by means of a stirring member, the larger the reservoir is, the larger the stirring member needs to be in order to obtain a stirring effect. As a result, the cost of the ink cartridge may be increased. These problems are present not only in ink cartridges, but also in liquid containing chambers in general that contain a dispersion substance with variation in concentration.

Therefore, the invention seeks to solve at least part of the above problems, reducing the variation in the concentration of the liquid in the liquid container by stirring liquid in a liquid container with a stirring member having a more compact size.

SUMMARY

An advantage of some aspects of the invention is that at least some of the above problems are solved thereby and the aspect of the invention can be implemented as the following embodiments or examples.

Example 1

A liquid containing chamber that supplies liquid to a liquid ejecting apparatus including: a liquid supply unit that supplies the liquid to the liquid ejecting apparatus; a first liquid container that is capable of containing the liquid, the first liquid container having a maximum length in the vertical direction which is longer than a maximum length in a direction perpendicular to the vertical direction in a mounted position in which the liquid containing chamber is mounted in the liquid ejecting apparatus that is placed on a flat plane perpendicular to the vertical direction such that the liquid supply unit is located at a vertically lower position; a first projection provided in the first liquid container; and a first stirring member supported by the first projection so as to be rotatable within a predetermined range of angles and having a plate shape extending from the supported position toward a bottom of the first liquid container in the mounted position, wherein the first stirring member is rotatable around the first projection by the acceleration of the liquid containing chamber including a predetermined direction component, and, in an initial state which is before the liquid is supplied by the liquid containing chamber to the liquid ejecting apparatus, when the first liquid container in the mounted position is divided into an upper container which is located vertically above the first projection and a lower container which is located vertically below the upper container, the lower container contains the liquid and the upper container contains the liquid and an amount of air that enables stirring of the liquid in the upper container including the liquid stirred by the first stirring member by allowing the movement of the liquid in the upper container.

According to the liquid containing chamber described in Example 1, the upper container contains an air and stirs the liquid in the upper container by means of the air that permits the movement of the liquid in the upper container including the liquid stirred by the first stirring member. That is, in the mounted position of the liquid containing chamber, it is possible to stir the entire liquid in the vertically long shaped first liquid container by the first stirring member without having a height of the first stirring member corresponding to the height of the first liquid container. This makes it possible to reduce the variation in the concentration of the liquid in the first liquid container while allowing the first stirring member to be more compact.

Example 2

The liquid containing chamber according to Example 1, wherein an end of the first stirring member opposing the bottom has a shape which generally corresponds to the entire area of at least the bottommost part of the bottom which is located at the bottommost position of the bottom, and in the mounted position, the first stirring member is arranged in the first liquid container such that the end is positioned at least in proximity to the bottommost part.

According to the liquid containing chamber described in Example 2, the liquid which is most likely to have highest concentration in the first liquid container, which is located in proximity to the bottommost part of the bottom, can be stirred, therefore the variation in the concentration of the liquid in the first liquid container can be reduced. The above description "a shape which generally corresponds to the entire area of the bottommost part of the bottom" means a shape such that the entire liquid which is located in proximity to the bottommost part of the bottom can be flown by the first stirring member. Specifically, when the liquid containing chamber is directly projected on the side perpendicular to the vertical direction in the mounted position, the length of the end which opposes the bottommost part is 70% or more of the length of the bottom. Further, the above description "in proximity to the bottommost part" means that, in the vertical direction in the mounted position, the length from the bottommost part to the end that opposes the bottommost part is 30% or less of the length from a point where the first stirring member is supported by the first projection to the end that opposes the bottommost part.

Example 3

The liquid containing chamber according to Example 2, wherein the end has a shape which generally corresponds to the entire area of the bottom, and in the mounted position, the first stirring member is arranged in the first liquid container such that the end is positioned at least in proximity to the bottom.

According to the liquid containing chamber described in Example 3, the liquid which is likely to have the higher concentration in proximity to the bottom can be stirred, therefore the variation in the concentration of the liquid in the first liquid container can be reduced. The above description “a shape which generally corresponds to the entire area of the bottom” means a shape such that the entire liquid which is located in proximity to the bottom can be flown by the first stirring member. Specifically, when the liquid containing chamber is directly projected on the side perpendicular to the vertical direction in the mounted position, the length of the end is 70% or more of a length of the bottom. Further, the above description “in proximity to the bottom” means that, in the vertical direction in the mounted position, the length from the bottom to the end that opposes the bottom is 30% or less of the length from a point where the first stirring member is supported by the first projection to the end that opposes the bottom.

Example 4

The liquid containing chamber according to any one of Examples 1 to 3, wherein in the initial state, the upper container contains air accounting for a volume of 30% or more and 50% or less of the volume of the upper container. According to the liquid containing chamber described in Example 4, it is possible to efficiently stir the entire liquid including the liquid which is located at the lowest position in the upper container by allowing the movement of the liquid in the upper container. Accordingly, the entire liquid in the upper container including the liquid stirred by the first stirring member can be efficiently stirred, therefore the variation in the concentration of the liquid in the first liquid container can be further reduced.

Example 5

The liquid containing chamber according to any one of Examples 1 to 4, further including: a second liquid container which is located downstream of the first liquid container in a flow direction of the liquid being supplied to the liquid ejecting apparatus, the second liquid container having a horizontally long shape in the mounted position; a second projection provided in the second liquid container; and a second stirring member supported by the second projection so as to be rotatable within a predetermined range of angles and having a plate shape extending from the supported position toward a second bottom which is the bottom of the second liquid container in the mounted position, wherein the first liquid container has an air communication hole for communicating with air, the second stirring member is rotatable around the second projection by the acceleration of the liquid containing chamber including a predetermined direction component, in the initial state, the second liquid container contains the liquid, and the second stirring member stirs the liquid contained in the second liquid container by rotation of the second stirring member.

According to the liquid containing chamber described in Example 5, even if the second liquid container is disposed downstream of the first liquid container, it is possible to reduce the variation in the concentration of the liquid in the second liquid container by the second stirring member stirring the liquid. Therefore, the liquid with the variation in concentration being reduced can be supplied to the liquid ejecting apparatus. Further, when the second liquid container is provided in addition to the first liquid container, a backflow of the liquid flowing from the first liquid container toward the air communication hole may be reduced, compared with when the second liquid container is not provided.

Example 6

The liquid containing chamber according to Example 5, further including: a second side which is perpendicular to the second bottom and opposes the plate surface of the second stirring member, wherein the second stirring member has a shape which covers the entire area of the second side when the second stirring member is directly projected on the second side, the second end of the second stirring member which opposes the second bottom has a shape which generally corresponds to the entire area of the second bottommost part which is located at the bottommost position of the second bottom, and in the mounted position, the second stirring member is arranged in the second liquid container such that the second end is positioned at least in proximity to the second bottommost part.

According to the liquid containing chamber described in Example 6, the liquid which is likely to have the highest concentration in proximity to the bottommost part of the second liquid container can be stirred. Further, the second stirring member has a shape so as to cover the entire area of the second side, thereby allowing the liquid moved upward by the second stirring member to be flown across the entire area of the second liquid container. Therefore, the variation in the concentration of the liquid in the second liquid container can be further reduced.

The above description “a shape which covers the entire area of the second side” means that the plate surface of the second stirring member has a surface area of 50% or more of the surface area of the second side. Further, the above description “a shape which generally corresponds to the entire area of the second bottommost part” means a shape such that the entire liquid in proximity to the second bottommost part can be flown by the first stirring member. Specifically, when the liquid containing chamber is directly projected on the side perpendicular to the vertical direction in the mounted position, the length of the second end is 70% or more of the length of the second bottommost part. Further, the above description “in proximity to the second bottommost part” means that, in the vertical direction in the mounted position, a length from the second bottommost part to the end that opposes the second bottommost part is 30% or less of the length from a point where the second stirring member is supported by the second projection to the end that opposes the second bottommost part.

Example 7

The liquid containing chamber according to Example 6, wherein the second end has a shape which generally corresponds to the entire area of the second bottom, and in the mounted position, the second stirring member is arranged in the second liquid container such that the second end is positioned in proximity to the second bottom.

According to the liquid containing chamber described in Example 7, the liquid which is likely to have the higher concentration in proximity to the bottom of the second liquid container can be stirred. This allows the liquid moved upward by the second stirring member in proximity to the second bottom can be flown across the entire area of the second liquid container. Therefore, the variation in the concentration of the liquid in the second liquid container can be further reduced.

The above description "a shape which generally corresponds to the entire area of the second bottom" means a shape such that the entire liquid in the second liquid container can be flown across the entire area in the second liquid container. Specifically, when the liquid containing chamber is directly projected on the side perpendicular to the vertical direction in the mounted position, the length of the second end is 70% or more of the length of the second bottom. Further, the above description "in proximity to the second bottom" means that, in the vertical direction in the mounted position, the length from the second bottom to the second end that opposes the second bottom is 30% or less of the length from a point where the second stirring member is supported by the second projection to the second end that opposes the second bottom.

Example 8

A liquid ejecting apparatus including the liquid containing chamber mounted therein according to any one of Examples 1 to 7.

According to the liquid ejecting apparatus described in Example 8, the liquid can be ejected with the variation in concentration being reduced.

The present invention can be implemented in various embodiments, such as the above mentioned liquid containing chambers and liquid ejecting apparatuses having such a liquid containing chamber as well as a method of stirring liquid in the liquid containing chamber.

BRIEF DESCRIPTION OF THE DRAWINGS

The invention will be described with reference to the accompanying drawings, wherein like numbers reference like elements.

DESCRIPTION OF EXEMPLARY EMBODIMENTS

The embodiments of the invention will be described below in the order of:

A. First embodiment; and

B. Variations of embodiments.

A. First Embodiment

A-1. Schematic Configuration of Ink Cartridge

Figure 1:
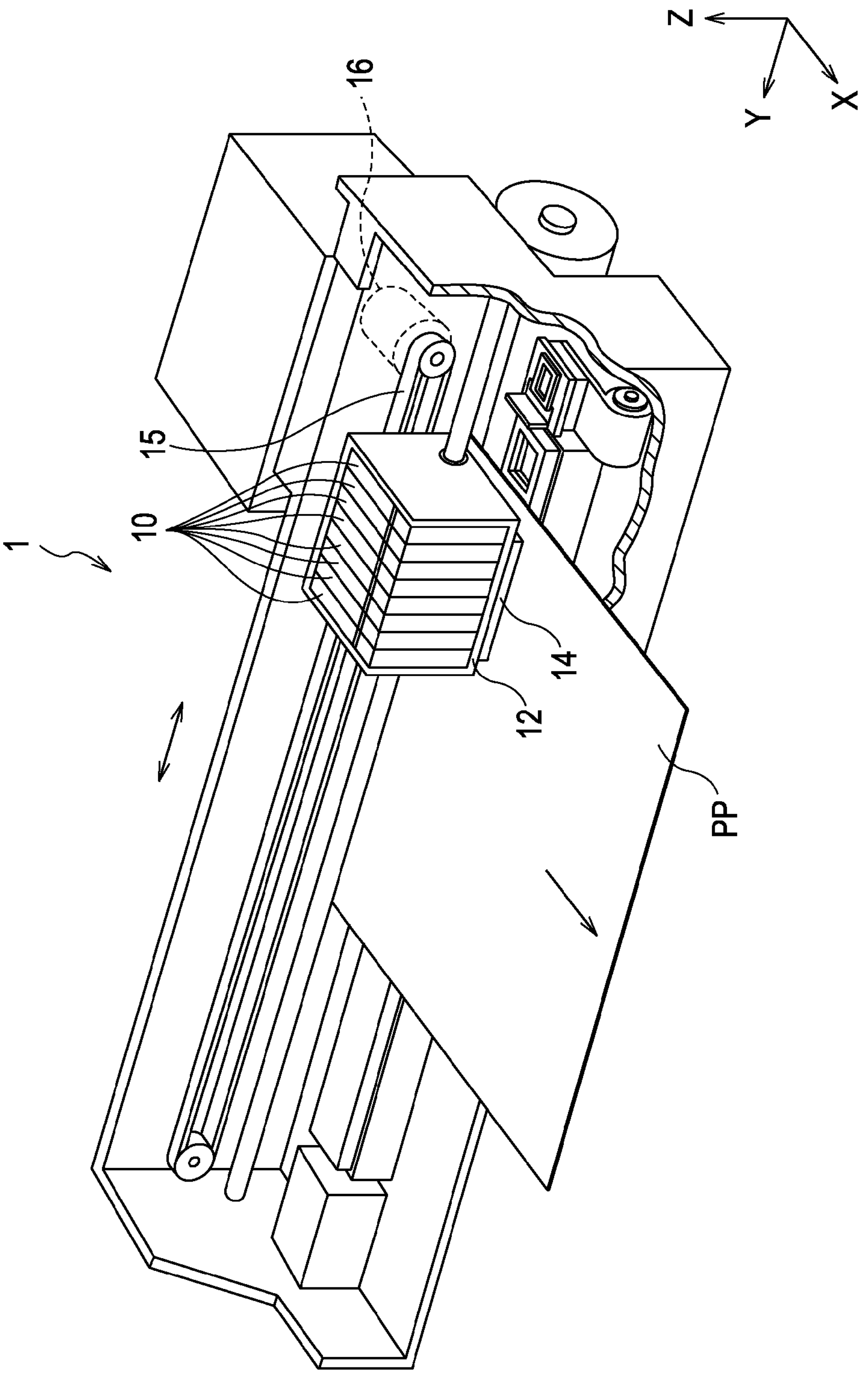
FIG. 1 is a view of a printer having an ink cartridge mounted thereon.

FIG. 1 is a view of an ink jet printer 1 having ink cartridges 10 mounted thereon according to a first embodiment of the present invention. The XYZ axes are used to identify the directions in FIG. 1 and in the subsequent figures, as necessary. An ink jet printer 1 (also referred to simply as "printer 1") as a liquid ejecting apparatus includes a carriage 12 that reciprocates (accelerates) in a main scan direction (a paper width direction). The carriage 12 is moved via a timing belt 15 by driving a stepping motor 16. A recording head 14 is mounted on the bottom of the carriage 12 such that ink is ejected through nozzles on the recording head 14 for printing on a printing sheet PP. The carriage 12 is also provided with a cartridge housing in which the ink cartridges 10 as a plurality of liquid containing chambers can be loaded. Each ink cartridge 10 has a liquid detector (not shown) for detecting the remaining amount of ink. The liquid detector is electrically connected to the printer 1, such that detection signals can be transmitted to and received from the printer 1.

Figure 2:
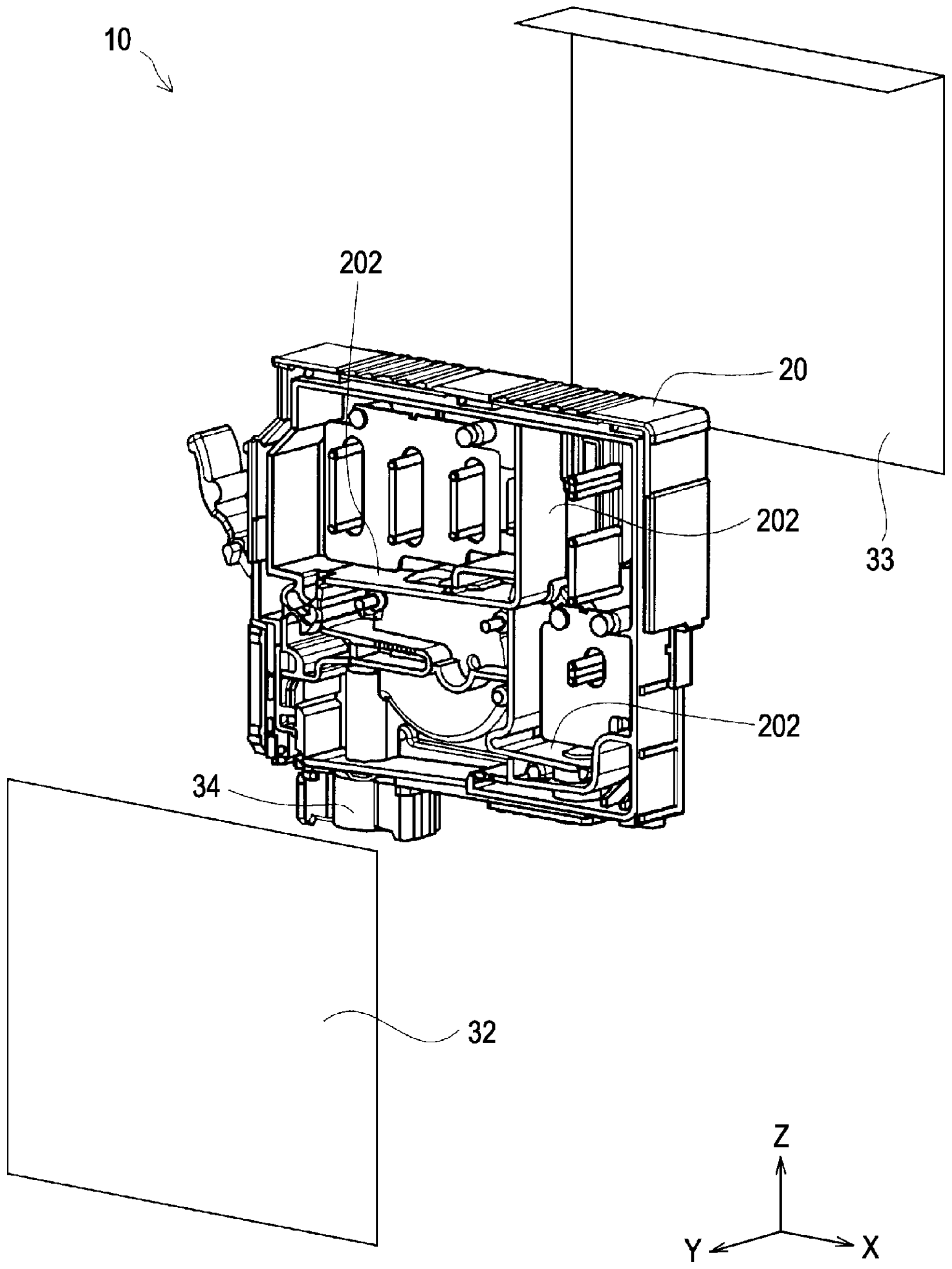
FIG. 2 is an exploded perspective view of the ink cartridge.

FIG. 2 is an exploded perspective view of the ink cartridge 10. The ink cartridge 10 includes a case body 20 which is open to one side (in the positive Y axis direction), a first film 32 which covers the open side of the case body 20, a second film 33 which covers the other side of the case body 20 (in the negative Y axis direction), and a cover member (not shown) which covers the first film 32. The ink cartridge 10 has a substantially rectangular appearance when each of the members are assembled together. The case body 20 and the cover member are each integrally formed of a synthetic resin such as polypropylene.

A plurality of ribs 202 in a variety shapes is formed in the case body 20. The first film 32 is closely adhered to the edges of the ribs 202 of the case body 20 so that no gap is formed therebetween. These ribs 202 and the first film 32 cooperatively form a plurality of small chambers (liquid containers) for containing the pigment ink. Hereinafter, the side of the case body 20 on which a plurality of small chambers are formed is referred to as the front side, while the opposite side to the front side is referred to as the rear side. The liquid container for containing the pigment ink will be described later in detail.

The case body 20 further includes a liquid supply unit 34 that supplies the pigment ink from the liquid container to the printer 1. A valve mechanism (not shown) is arranged inside the liquid supply unit 34. When the ink cartridges 10 are mounted in the carriage 12 (FIG. 1), a liquid supply needle (not shown) disposed on the carriage 12 works to open the valve mechanism which is arranged inside the liquid supply unit 34. This allows the pigment ink to flow into the liquid supply needle, and to then be supplied to the printer 1. An air open hole 100 (see FIG. 4) for introducing air into the ink cartridge 10 is further provided on the side of the case body 20 on which the liquid supply unit 34 is formed (in the negative Z axis direction). Further, various flow channels, which will be described below in detail, are formed on the rear side of the case body 20. In addition, a differential valve 37*a* (see FIG. 5)

that maintains a specific area in the case body 20 at a negative pressure is also disposed on the rear side of the case body 20.

Figure 3:
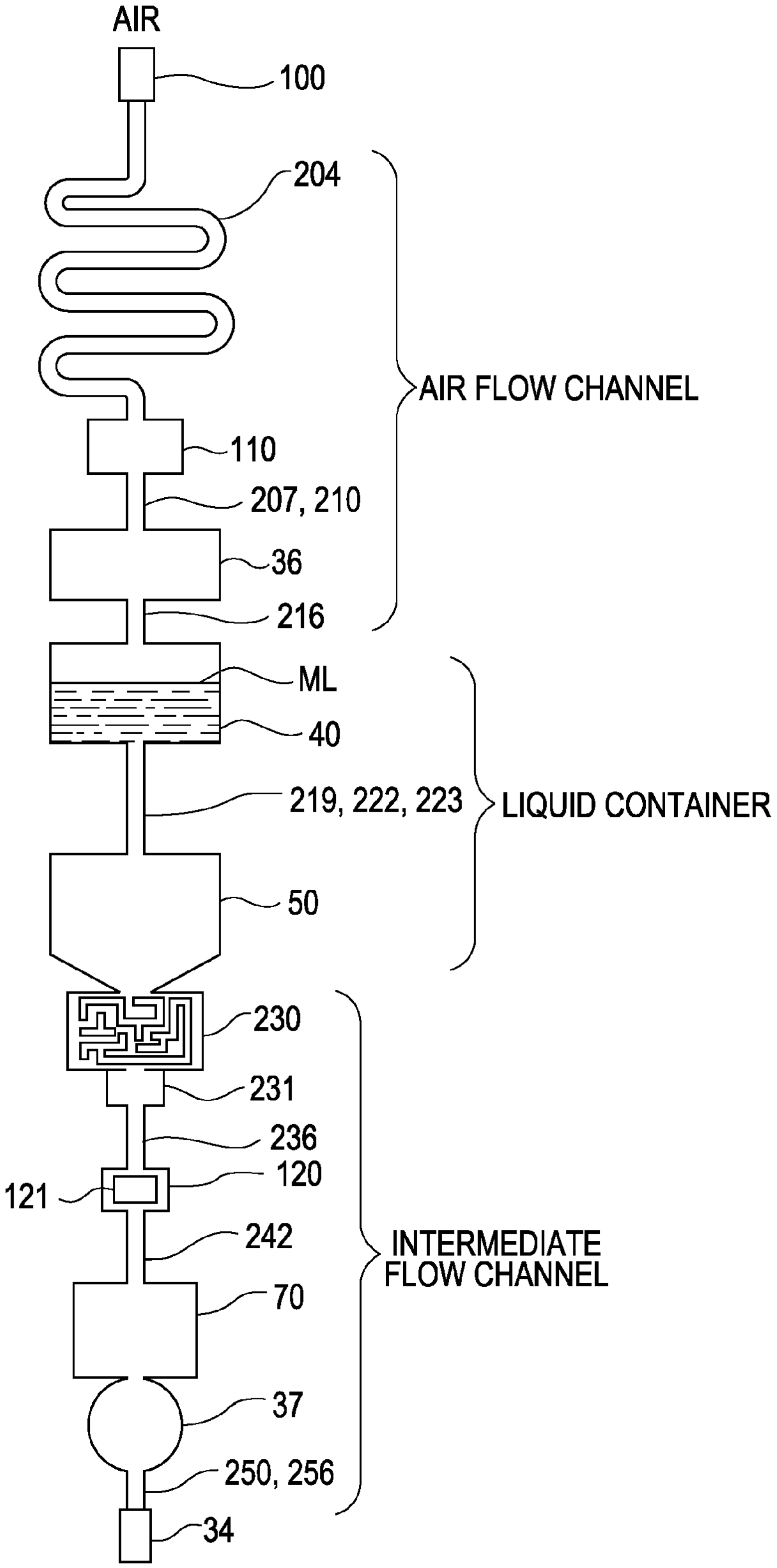
FIG. 3 is a schematic view of a path extending from an air open hole to a liquid supply unit.

Next, before explaining a configuration of the ink cartridge 10 in further detail, a path extending from the air open hole 100 to the liquid supply unit 34 is described below with reference to FIG. 3 to facilitate understanding. FIG. 3 is a schematic view of the path extending from the air open hole 100 of the ink cartridge 10 to the liquid supply unit 34.

The path extending from the air open hole 100 to the liquid supply unit 34 is broadly divided into a liquid container where the pigment ink is contained, an air flow channel that is located upstream of the liquid container, and an intermediate flow channel that is located downstream of the liquid container. The term "upstream" and "downstream" as used herein are defined based on the flow direction of the pigment ink being supplied to the printer 1.

The liquid container is composed of a first liquid container 40, a first container connection path 219, a second container connection path 222, a third container connection path 223 and a second liquid container 50, arranged in sequence in the downstream direction. The first and second liquid containers 40 and 50 communicate via the first, second and third container connection paths 219, 222 and 223.

The air flow channel is composed of a meandering path 204, an air/liquid separation chamber 110, a first connection path 207, a second connection path 210, an air container 36 and a third connection path 216, arranged in sequence in the downstream direction. The meandering path 204 is formed in an elongated meandering shape so as to increase the distance from the air open hole 100 to the first liquid container 40. This can help reduce water evaporation from the pigment ink which is contained in the liquid container. An air/liquid separation film, which is not shown, is arranged in the air/liquid separation chamber 110. The air/liquid separation film is made of a material that is permeable to gas but impermeable to liquid. Further, an air container 36 for containing air is disposed downstream of the air/liquid separation chamber 110. The air/liquid separation chamber 110 and the air container 36 communicate via the first and second connection paths 207 and 210, while the air container 36 and the first liquid container 40 communicate via the third connection path 216.

The intermediate flow channel is composed of a labyrinth flow channel 230, a liquid flow section 231, a first liquid flow channel 236, a sensor unit 120, a second liquid flow channel 242, a buffer chamber 70, a differential pressure valve containing chamber 37 that contains the differential pressure valve, a third liquid flow channel 250 and a fourth liquid flow channel 256, arranged in sequence in the downstream direction. The labyrinth flow channel 230 is in a three-dimensional labyrinth form. The liquid flow section 231 is connected downstream of the labyrinth flow channel 230. The liquid flow section 231 and the sensor unit 120 communicate via the first liquid flow channel 236. A sensor 121 is arranged in the sensor unit 120. As the pigment ink is used in the printer 1 and air is introduced into the sensor unit 120, the sensor 121 outputs a signal indicative of a shortage of ink to the printer 1.

The sensor unit 120 and the buffer chamber 70 communicate via the second liquid flow channel 242. The differential pressure valve which is contained in the differential pressure valve containing chamber 37 adjusts a pressure of the pigment ink downstream of the differential pressure valve containing chamber 37 to be lower than a pressure of the pigment ink upstream of the differential pressure valve containing chamber 37. Moreover, the differential pressure valve maintains the pigment ink downstream of the differential pressure valve containing chamber 37 at a negative pressure. The differential pressure valve containing chamber 37 and the liquid supply unit 34 communicate via the third and fourth liquid flow channels 250 and 256. In an initial state, in which the ink cartridge 10 is in the same state as when it was made as a finished product (i.e., before the pigment ink is supplied to the printer 1), the liquid surface of the pigment ink comes to the position in the first liquid container 40 which is schematically shown by the dotted line ML.

Figure 4:
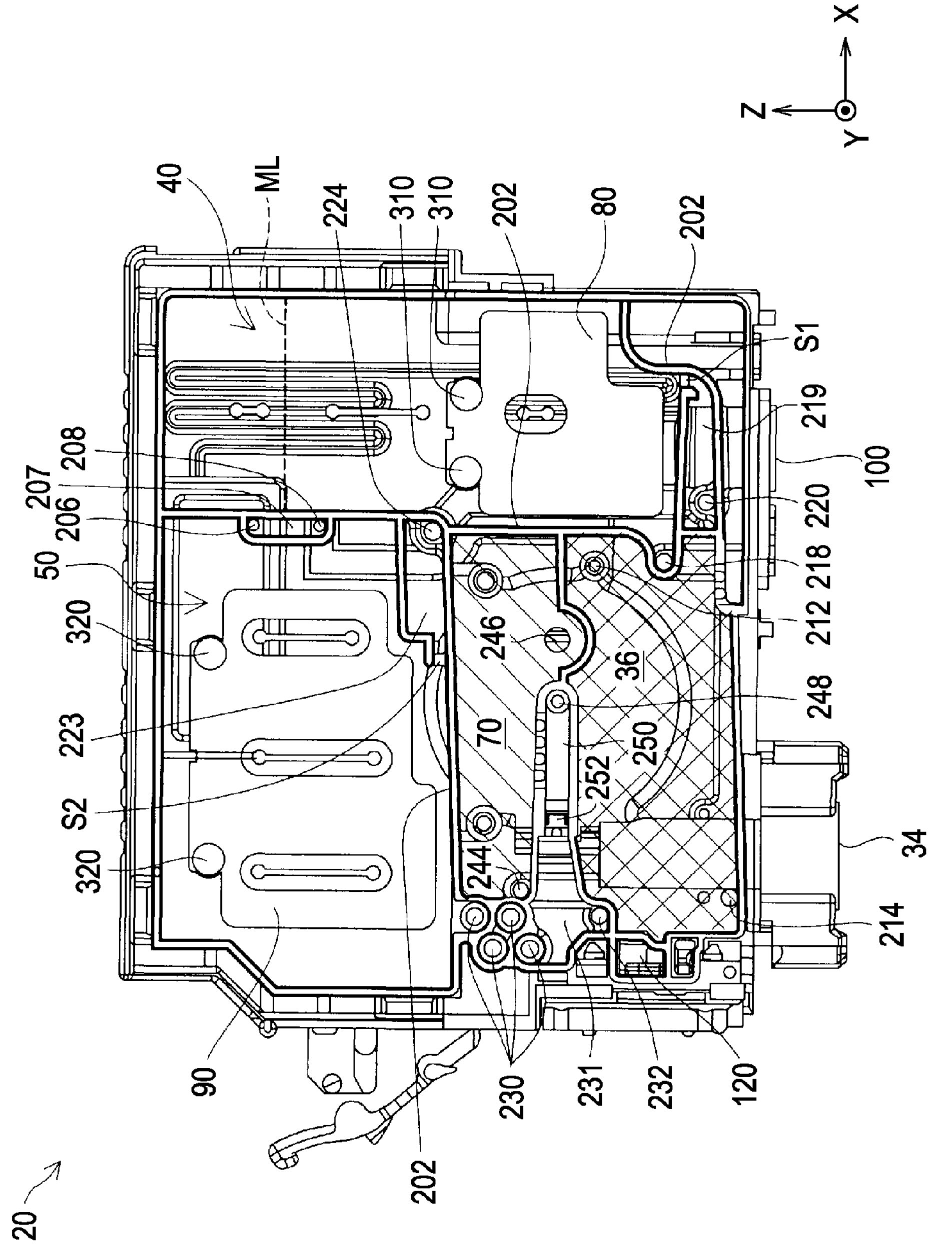
FIG. 4 is a front elevation view of a case body.

FIG. 4 is a front elevation view of the case body 20. In FIG. 4, the ink cartridge 10 is in a state of being mounted in the carriage 12 (FIG. 1) of the printer 1 (hereinafter, also referred to as "mounted position"), where the Z axis is the vertical direction and the negative Z axis is the vertically down direction. Moreover, in the mounted position, the ink cartridge 10 is reciprocated (accelerated) along the Y axis by reciprocating (accelerating) the carriage 12. It should be noted that the mounted position refers to the position in which the ink cartridge 10 is mounted in the printer 1 that is placed on the flat plane perpendicular to the vertical direction.

In the air flow channel, the first connection path 207 and the air container 36 is formed on the front side of the case body 20. In FIG. 4, the air container 36 is shown cross hatched for purpose of illustration.

In the liquid container, the first liquid container 40, the first container connection path 219, the third container connection path 223 and the second liquid container 50 are formed on the front side of the case body 20. A first stirring member 80 for stirring the pigment ink is disposed in the first liquid container 40. Further, a first support member 310 that supports the first stirring member 80 is also disposed in the first liquid container 40 such that the first stirring member 80 is rotatable within a predetermined range of angles. Similarly, a second stirring member 90 for stirring the pigment ink is disposed in the second liquid container 50. Further, a second support member 320 that supports the second stirring member 90 is also disposed in the second liquid container 50 such that the second stirring member 90 is rotatable within a predetermined range of angles. The first and second stirring members 80 and 90 are both formed in a plate shape having a given thickness and made of a member having a specific gravity greater than that of the pigment ink contained in the ink cartridge 10. The first and second support members 310 and 320 are part of the case body 20 and integrally formed with the case body 20. In this embodiment, the first and second stirring members 80 and 90 are made of stainless steel. The details of the first and the second liquid containers 40, 50, the first and second stirring members 80, 90 and the first and second support members 310, 320 will be further described later.

In the intermediate flow channel, part of the labyrinth flow channel 230, the liquid flow section 231, the buffer chamber 70 and the third liquid flow channel 250 are formed on the front side of the case body 20. In FIG. 4, the buffer chamber 70 is shown single hatched for the purpose of illustration. Further, the sensor unit 120 is formed inside the lower left portion of the case body 20 in FIG. 4.

Figure 5:
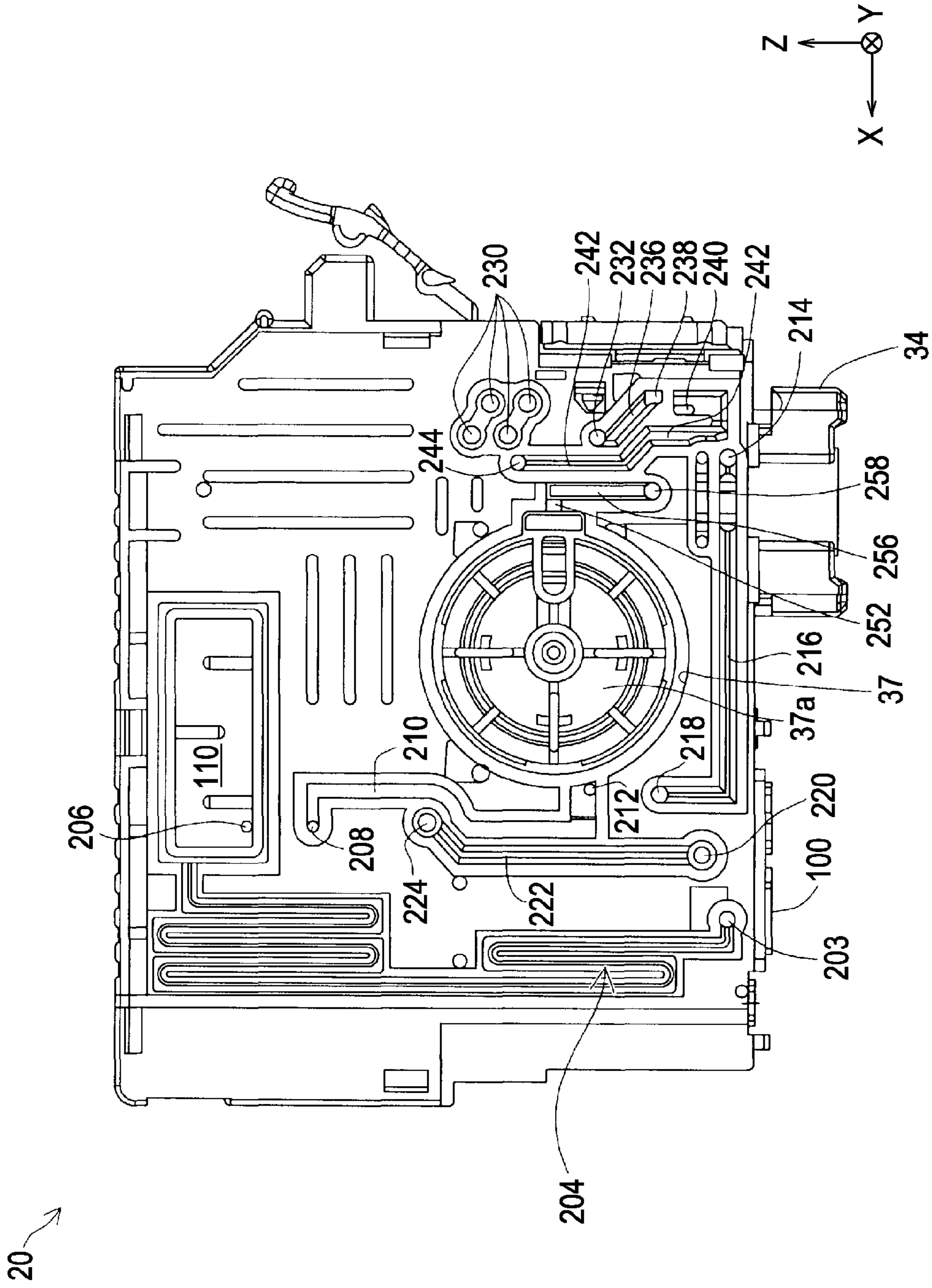
FIG. 5 is a rear elevation view of the case body.

FIG. 5 is a rear elevation view of the case body 20. In the air flow channel, the meandering path 204, the air/liquid separation chamber 110, the second connection path 210 and the third connection path 216 are formed on the rear side of the case body 20. In the liquid container, the second container connection path 222 is formed on the rear side of the case body 20. In the intermediate flow channel, part of the labyrinth flow channel 230, the first liquid flow channel 236, the second liquid flow channel 242, the differential pressure valve containing chamber 37 and the fourth liquid flow channel 256 are formed on the rear side of the case body 20. The meandering path 204, the second connection path 210, the second container connection path 222, the first liquid flow channel 236, the second liquid flow channel 242 and the fourth liquid flow channel 256 are groove-shaped flow channels. The differential pressure valve containing chamber 37 is a space having a substantially cylindrical shape, in which the differential pressure valve 37*a* is housed.

As shown in FIGS. 4 and 5, the communication holes 203, 206, 208, 212, 214, 218, 220, 224, 232, 238, 240, 244, 246, 248, 252 and 258 are formed in the case body 20 so as to allow the respective elements of the air flow channel, the liquid container and the intermediate flow channel to communicate with each other. The air open hole 100 and the meandering path 204 communicate via the communication hole 203 (FIG. 5). The air/liquid separation chamber 110 and the first connection path 207 (FIG. 4) communicate via the communication hole 206 (FIG. 5). The first connection path 207 and the second connection path 210 (FIG. 5) communicate via the communication hole 208. The second connection path 210 and the air container 36 (FIG. 4) communicate via the communication hole 212. The air container 36 and the third connection path 216 (FIG. 5) communicate via the communication hole 214. The third connection path 216 and the first liquid container 40 (FIG. 4) communicate via the communication hole 218. The first liquid container 40 and the first container connection path 219 (FIG. 4) communicate via a gap S1 between the ribs, and the first container connection path 219 and the second container connection path 222 (FIG. 5) communicate via the communication hole 220. The second container connection path 222 and the third container connection path 223 (FIG. 4) communicate via the communication hole 224.

The third container connection path 223 communicates with the second liquid container 50 via a gap S2 between the ribs. The second liquid container 50 communicates with the upstream end of the labyrinth flow channel 230, while the downstream end of the labyrinth flow channel 230 communicates with the liquid flow section 231.

The liquid flow section 231 and the first liquid flow channel 236 (FIG. 5) communicate via the communication hole 232. The first liquid flow channel 236 and the sensor unit 120 (FIG. 4) communicate via the communication hole 238. The sensor unit 120 and the second liquid flow channel 242 (FIG. 5) communicate via the communication hole 240. The second liquid flow channel 242 and the buffer chamber 70 (FIG. 4) communicate via the communication hole 244. The buffer chamber 70 and the differential pressure valve containing chamber 37 (FIG. 5) communicate via the communication hole 246. The differential pressure valve containing chamber 37 and the third liquid flow channel 250 (FIG. 4) communicate via the communication hole 248. The third liquid flow channel 250 and the fourth liquid flow channel 256 (FIG. 5) communicate via the communication hole 252. The fourth liquid flow channel 256 and a flow channel formed in the liquid supply unit 34 in the vertical direction communicate via the communication hole 258. That is, the pigment ink passes through the communication hole 258 and flows into the liquid supply unit 34 and then into the printer 1.

As the pigment ink is supplied from the liquid supply unit 34 to the printer 1, air is introduced through the air open hole 100 into the ink cartridge 10.

A-2. Detailed Configuration of Liquid Container of Ink Cartridge

Figure 6:
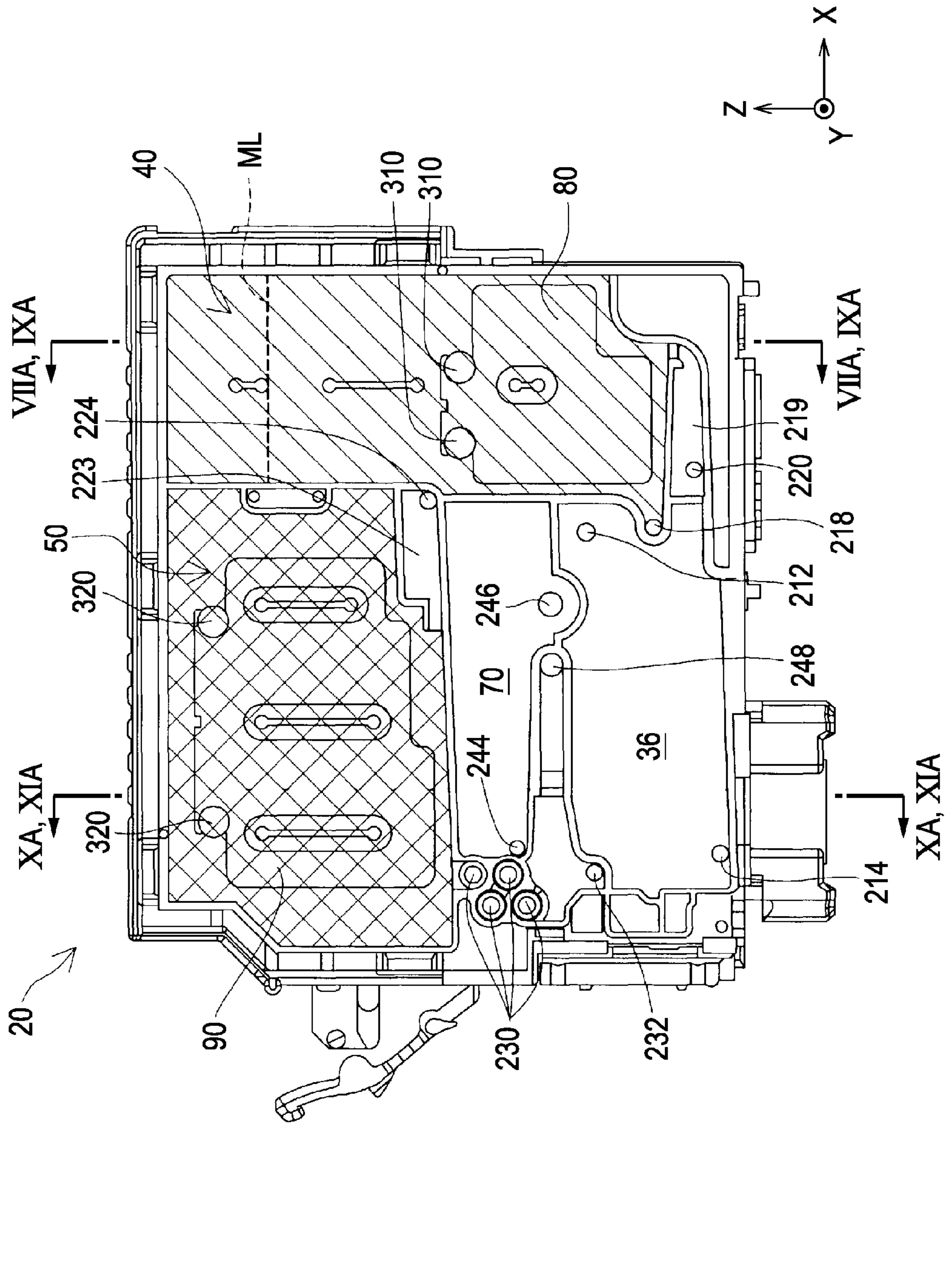
FIG. 6 is a view explaining first and second liquid containers.

FIG. 6 is a view of the first and second liquid containers 40 and 50. FIG. 6 is a front elevation view of the case body 20 with part of the configuration that does not need to be explained not being shown. The first liquid container 40 is single hatched and the second liquid container 50 is cross hatched for clarity of illustration. In the mounted position, the first liquid container 40 is vertically long, while the second liquid container 50 is horizontally long. The term "vertically long" means that the first liquid container 40 is oriented in the mounted position so as to have the outer dimensions in which the maximum length in the vertical direction (Z axis direction) is longer than the maximum length in the direction perpendicular to the vertical direction and parallel to a first side, which is described later (X axis direction). Further, the term "horizontally long" means that the second liquid container 50 is oriented in the mounted position so as to have outer dimensions in which the maximum length in the Z axis direction is shorter than the maximum length in the X axis direction. In the initial state of the ink cartridge 10, the pigment ink is contained in the ink cartridge 10 such that the liquid surface of the pigment ink comes to the position in the first liquid container 40 as indicated by the dotted line ML. That is, the first liquid container 40 contains both the pigment ink and air in the initial state, while the second liquid container 50 is filled with the pigment ink in the initial state.

Figure 7B:
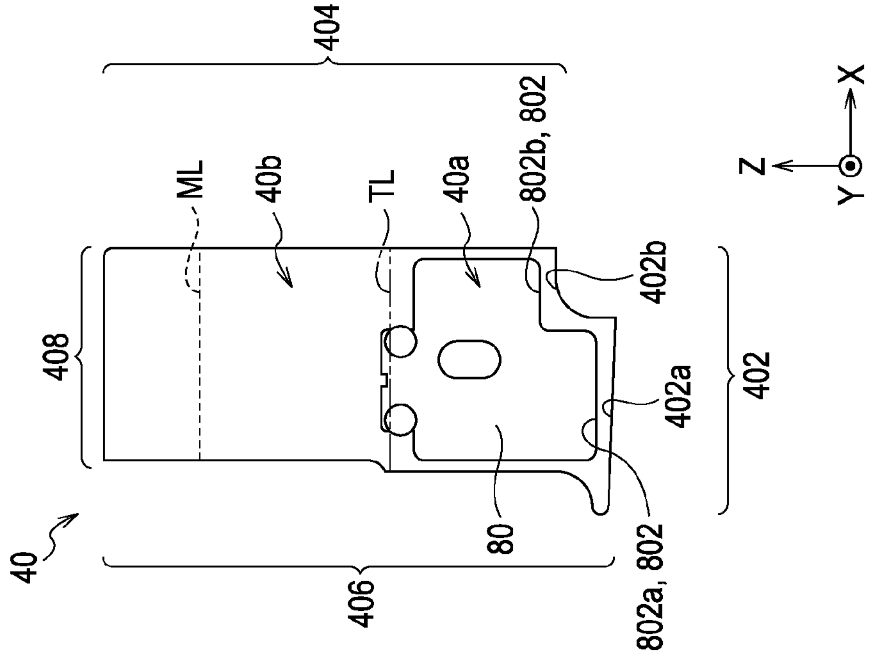
FIGS. 7A and 7B are views explaining a configuration of the first liquid container.
Figure 7A:
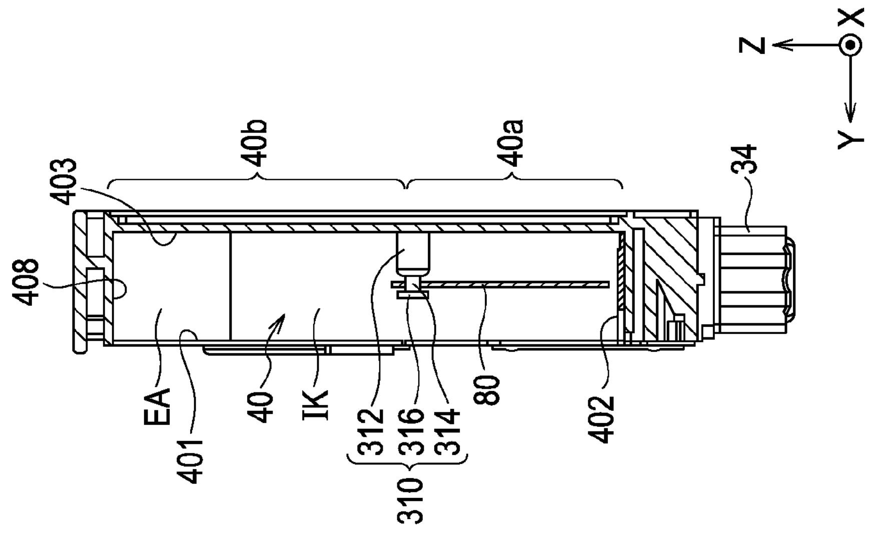

FIG. 7 is a view of a configuration of the first liquid container 40. FIG. 7A is a sectional view taken along the line VIIA-VIIA of FIG. 6 with part of the configuration that does not need to be explained not being shown. FIG. 7B is a view of the first liquid container 40 seen from the positive Y axis with part of the configuration that does not need to be explained not being shown. That is, FIG. 7B corresponds to a view in which the first stirring member 80 is directly projected on the first side, which is described later. In FIG. 7B, the liquid surface of the pigment ink is indicated by the dotted line ML. The boundary between an upper container 40*b* and a lower container 40*a* of the first liquid container 40, both of which are described later, is indicated by the dashed dotted line TL.

As shown in FIG. 7A, the first liquid container 40 is an area defined by a bottom 402 which is located at a vertically lower position, a top 408 which is located vertically above the bottom 402 so as to oppose the bottom 402 and a first side 403 perpendicular to the bottom 402 and extends upwardly from the bottom 402 in the mounted position. The first side 403 is positioned so as to oppose the plate surface of the first stirring member 80. A side 401 which opposes the first side 403 is entirely open. As shown in FIG. 7B, the first liquid container 40 is further defined by a first member side 404 and a second member side 406 which both extend upwardly from the bottom 402.

As shown in FIG. 7B, the bottom 402 has a bottommost part of the bottom 402*a* and an upper part of the bottom 402*b*. The bottommost part of the bottom 402*a* is a plane located at the bottommost position of the bottom 402 and substantially parallel to the direction perpendicular to the vertical direction and parallel to the first side 403 (also referred to as "horizontal direction" or "X axis direction"). The upper part of the bottom 402*b* is a plane located above the bottommost part of the bottom 402*a* and substantially parallel to the horizontal direction. The first stirring member 80 has a shape which allows the entire pigment ink in proximity to the bottom 402 to be stirred. Specifically, an end 802 of the first stirring member 80 has a first end 802*a* which opposes the bottommost part of the bottom 402*a* and a second end 802*b* which opposes the upper part of the bottom 402*b*. The end 802 has a shape which generally corresponds to the entire area of the bottom 402. The shape of the first stirring member 80 will be described later in detail. Moreover, the first stirring member 80 is arranged in the first liquid container 40 such that the end 802 is in proximity to the bottom 402.

As shown in FIG. 7A, two first support members 310 (one of them is shown in the figure) which extend from the first side 403 toward the open side are formed in the first liquid container 40. The first support member 310 is composed of a base 312 in a substantially cylindrical shape, a cylindrical projection 314 connected to the base 312 and a first stopper 316 in a circular plate shape which is connected to the projection 314. Two notches are formed on the outer periphery of the first stirring member 80. When those notches are interdigitated with the projection 314 having a certain gap therebetween, the first stirring member 80 is support by the first support member 310 to be rotatable within a predetermined range of angles.

The first stirring member 80 is a plate member having a given thickness. The first stirring member 80 extends from the position supported by the projection 314 toward the bottom 402 by a given distance. When the ink cartridge 10 is loaded in the carriage 12 (FIG. 1), the ink cartridge 10 moves with acceleration in the main scan direction that is perpendicular to the first side 403. The concept of the term acceleration as used herein includes deceleration. When the ink cartridge 10 moves with acceleration in the positive Y axis direction or negative Y axis direction, the inertia force is applied on the first stirring member 80. As a result, the first stirring member 80 rotates around the projection 314. That is, the movement with acceleration of the ink cartridge 10 including a component in the direction perpendicular to the first stirring member 80 (Y axis direction) causes the rotation of the first stirring member 80.

Here, the first liquid container 40 is described as divided into an upper container 40*b* which is located above the projection 314 and a lower container 40*a* which is located below the upper container 40*b*. In the initial state, the lower container 40*a* contains the pigment ink IK, while the upper container 40*b* contains the pigment ink IK and a predetermined amount of air EA. Specifically, the upper container 40*b* contains an enough amount of air EA to stir the pigment ink that is brought in proximity to the lower area of the upper container 40*b* by stirring of the first stirring member 80. When the ink cartridge 10 is loaded in an on-carriage type printer that is commonly used, it is preferable that the upper container 40*b* contains air EA having a volume of 30% or more of the volume of the upper container 40*b*, although it may vary depending on the degree of acceleration of the ink cartridge 10. In this embodiment, the upper container 40*b* contains air EA having a volume of 30% of the volume of the upper container 40*b*. In other words, the upper container 40*b* contains air EA having a volume of 8% of the entire volume of first liquid container 40.

Figure 8:
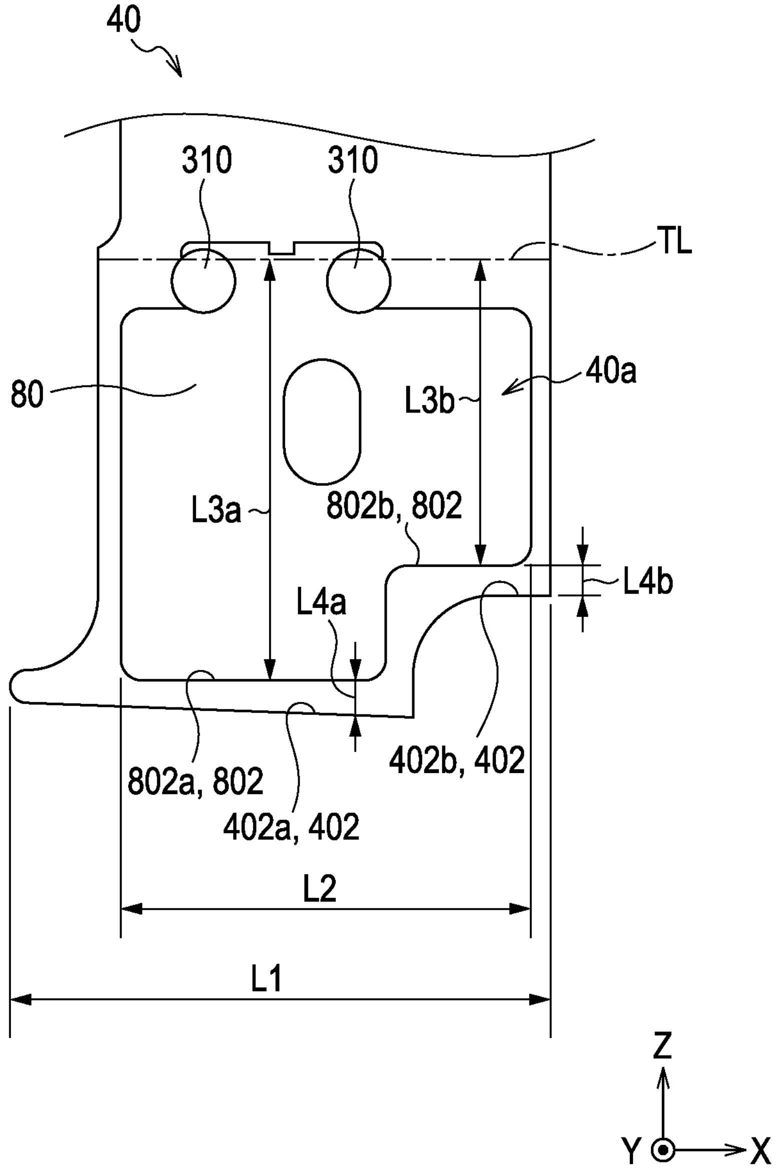
FIG. 8 is a view explaining a relationship between a first stirring member and a bottom.

FIG. 8 is a view explaining a relationship between the first stirring member 80 and the bottom 402. FIG. 8 is a partial enlarged view enlarging the proximity of the bottom 402 of FIG. 7B. The above description "the end 802 has a shape which generally corresponds to the entire area of the bottom 402" means that a length L2 of the end 802 of the first stirring member 80 in the horizontal direction (X axis direction) is 70% or more of a length L1 of the bottom 402 of the first liquid container 40. In this embodiment, the length L2 is defined as 75% of the length L1. Moreover, the first stirring member 80 is arranged in the first liquid container 40 such that the end 802 is in proximity to the bottom 402, thereby allowing the entire pigment ink in proximity to the bottom 402 to be flown upward. The above description "in proximity to" means that, in the vertical direction (Z axis direction) in the mounted position, a length L4 (which corresponds to lengths L4*a*, L4*b* of FIG. 8) extending from the end 802 to the bottom 402 that opposes the end 802 is 30% or less of a length L3 (which corresponds to lengths L3*a*, L3*b* of FIG. 8) extending from the contact point where the first stirring member 80 is in contact with the projection 314 to the end 802 (the position of the contact point in the vertical direction is indicated by the dashed dotted line TL in the FIG. 8). In FIG. 8, the length from the contact point to the first end 802*a* is indicated by L3*a* and the length from the first end 802*a* to the bottommost part of the bottom 402*a* which opposes to the first end 802*a* is indicated by L4*a*. Further, the length from the contact point to the second end 802*b* is indicated by L3*b* and the length from the second end 802*b* to the upper part of the bottom 402*b* which opposes to the second end 802*b* is indicated by L4*b*. It is preferable that the first stirring member 80 is arranged such that a narrow gap is formed between the bottom 402 and the end 802 so as to avoid them from coming in contact with each other, thereby allowing the entire pigment ink in proximity to the bottom 402 to be flown upward with a high certainty.

FIG. 9 is a view explaining a stirring state of the first liquid container 40. FIG. 9A is a sectional view taken along the line IXA-IXA of FIG. 6, which shows the ink cartridge 10 is mounted in the carriage 12 (FIG. 1) with the carriage 12 being in a stationary state. FIG. 9B is a sectional view taken along the line IXA-IXA of FIG. 6, which shows the carriage 12 is accelerating to the negative Y axis direction. FIG. 9C is a sectional view taken along the line IXA-IXA of FIG. 6, which shows the carriage 12 is accelerating to the positive Y axis direction. FIG. 9D shows the flowing state of the pigment ink in the first liquid container 40, which is caused by acceleration of the carriage 12. In FIGS. 9A to D, part of the configuration that does not need to be explained is not shown.

Figure 9A:
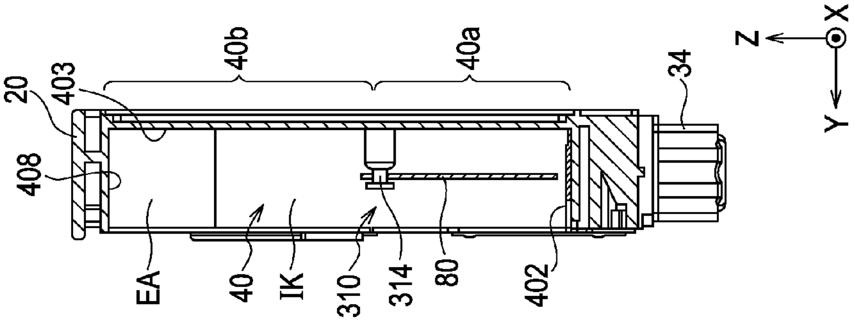
FIGS. 9A, 9B, 9C and 9D are views explaining a stirring state of the first liquid container.

As shown in FIG. 9A, in the initial state of the ink cartridge 10, when the ink cartridge 10 is mounted in the carriage 12, the lower container 40*a* contains the pigment ink IK and the upper container 40*b* contains the pigment ink IK and air EA. From this state, the carriage 12 start to reciprocate (accelerate) to the direction perpendicular to the first side 403 (Y axis direction) in response to meeting predetermined requirements. Such requirements include, as part of the requirements, that a controller of the printer 1 has sent a printing command, that the ink cartridge 10 has been replaced by new ink cartridge 10 and that a predetermined time has elapsed after the carriage 12 had last reciprocated, thereby variation in the concentration of the pigment ink is highly possible to occur.

Figure 9B:
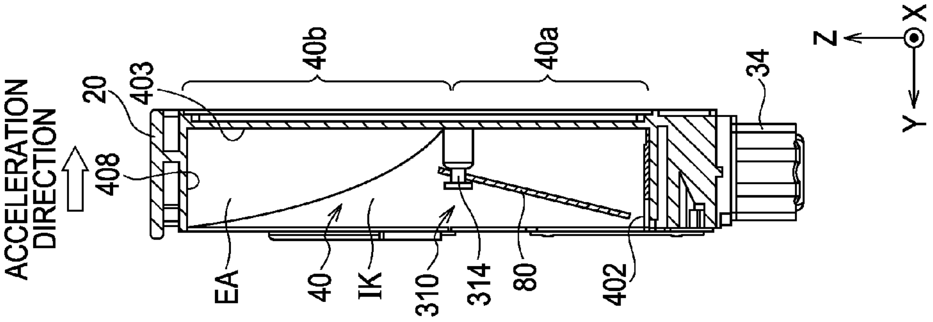

As shown in FIG. 9B, when the carriage 12 accelerates to the negative Y axis direction, the inertia force acting in the direction opposite to the acceleration direction (positive Y axis direction) is applied on the first stirring member 80 and the pigment ink IK. As a result, the first stirring member 80 rotates to the positive Y axis direction while the pigment ink IK in the upper container 40*b* moves to the positive Y axis direction.

Figure 9C:
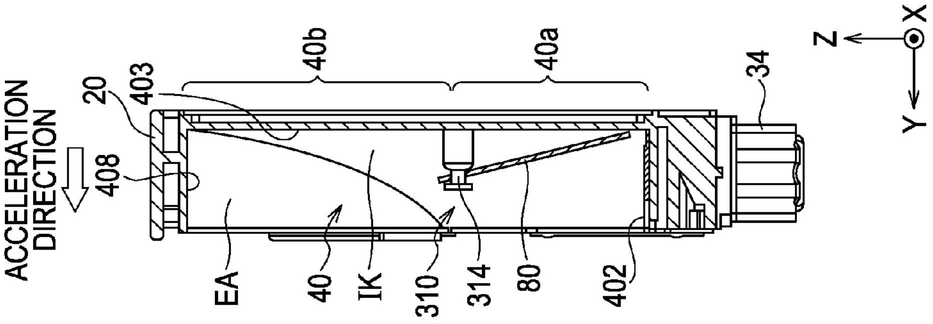

As shown in FIG. 9C, when the carriage 12 accelerates to the positive Y axis direction, the inertia force acting in the negative Y axis direction is applied on the first stirring member 80 and the pigment ink IK. As a result, the first stirring member 80 rotates to the negative Y axis direction while the pigment ink IK in the upper container 40*b* moves to the negative Y axis direction.

Figure 9D:
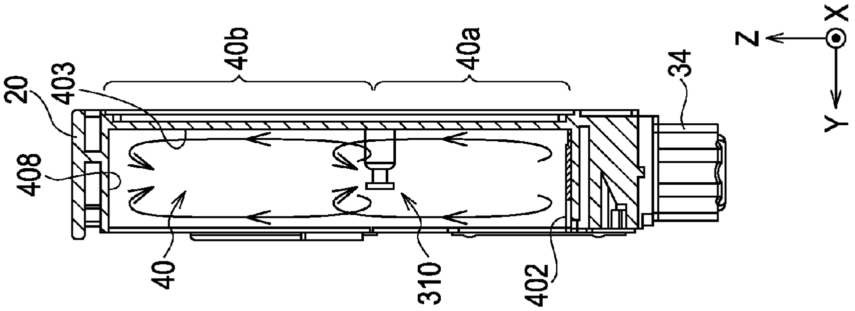

As shown in FIG. 9D, the pigment ink IK in the lower container 40*a* is stirred by the first stirring member 80 and flown across the entire area in the lower container 40*a*. Specifically, the pigment ink IK with the higher concentration, which is brought in proximity to the bottom 402 by stirring of the first stirring member 80, is flown up above the first support member 310. The pigment ink IK in the upper container 40*b* is flown across the entire area in the upper container 40*b* by movement of itself.

As described above, the pigment ink IK with the higher concentration in proximity to the bottom 402 in the first liquid container 40 is flown up above the first support member 310 by the first stirring member 80, and the flown up pigment ink IK moves in the upper container 40*b* so as to be flown across the entire area in the upper container 40*b*. Therefore, the first stirring member 80 can efficiently stir the pigment ink in the first liquid container 40 of a vertically long shape without having a height corresponding to the height of the first liquid container 40. This makes it possible to reduce the variation in the concentration of the pigment ink IK in the first liquid container 40 while allowing the first stirring member 80 to be more compact.

Figure 10B:
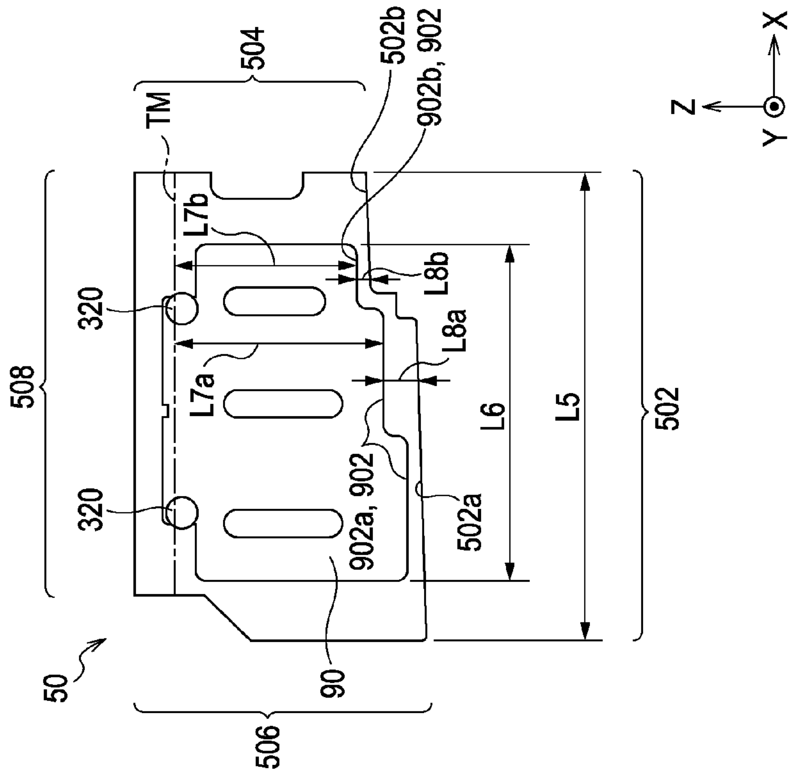
FIGS. 10A and 10B are views explaining a configuration of the second liquid container.
Figure 10A:
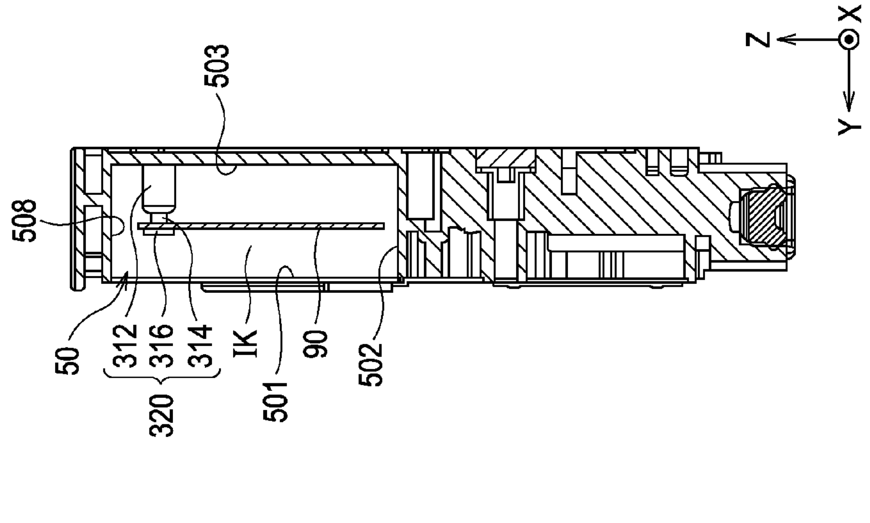

FIG. 10 is a view explaining a configuration of the second liquid container 50. FIG. 10A is a sectional view taken along the line XA-XA of FIG. 6 with part of the configuration that does not need to be explained not being shown. FIG. 10B is a view of the second liquid container 50 seen from the positive Y axis direction with part of the configuration that does not need to be explained not being shown. That is, FIG. 10B corresponds to a view in which the second stirring member 90 is directly projected on the first side, which is described later. In the initial state of the ink cartridge 10, the second liquid container 50 is filled with the pigment ink IK.

As shown in FIG. 10A, the second liquid container 50 is an area defined by a bottom 502 which is located at a vertically lower position, a top 508 which is located vertically above the bottom 502 so as to oppose the bottom 502 and a first side 503 perpendicular to the bottom 502 and extends upwardly from the bottom 502 in the mounted position. The first side 503 is formed of the same member as that of the first side 403 (FIG. 7A) of the first liquid container 40 such that the first side 403 of the first liquid container 40 is flush with the first side 503 of the second liquid container 50. The first side 503 is positioned so as to oppose the plate surface of the second stirring member 90. A side 501 which opposes the first side 503 is entirely open. As shown in FIG. 10B, the second liquid container 50 is further defined by a first member side 504 and a second member side 506 which both extend upwardly from the bottom 502. The bottom 502 is step-shaped having a bottommost part of the bottom 502*a* and an upper part of the bottom 502*b*. The bottommost part of the bottom 502*a* is a plane located at the bottommost position of the bottom 502 and substantially parallel to the direction perpendicular to the vertical direction and parallel to the first side 503 (also referred to as "horizontal direction"). The upper part of the bottom 502*b* is a plane located at the topmost position of the bottom 502 and substantially parallel to the horizontal direction. The second stirring member 90 has an end 902 which opposes the bottom 502. Specifically, the second stirring member 90 has a first end 902*a* which opposes the bottommost part of the bottom 502*a* and a second end 902*b* which opposes the upper part of the bottom 502*b*. The "the bottom 502" corresponds to "the second bottom" described in the summary section herein and "the first side 503" corresponds to "the second side" described in the summary section herein.

As shown in FIG. 10A, two second support members 320 (one of them is shown in the figure) which extend from the first side 503 toward the open side are formed in the second liquid container 50. The second support member 320 is formed in the same configuration as that of the first support member 310 (FIG. 7A) of the first liquid container 40, therefore the same reference numerals are used for similar elements to avoid duplication of description.

The second stirring member 90 has a shape which allows the entire pigment ink in proximity to the bottom 502 to be flown across the entire area in the second liquid container 50. Specifically, the second stirring member 90 is formed in a shape to cover the first side 503. Further, the end 902 of the second stirring member 90 which opposes the bottom 502 has a shape which generally corresponds to the entire area of the bottom 502. Moreover, the second stirring member 90 is arranged in the second liquid container 50 such that the end 902 is in proximity to the bottom 502.

The above description "the second stirring member 90 is formed in a shape to cover the first side 503" means that the plate surface of the second stirring member 90 has a surface area of 50% or more of the surface area of the first side 503. In this embodiment, the plate surface of the second stirring member 90 has a surface area of 55% of the surface area of the first side 503. Further, the above description "the end 902 has a shape which generally corresponds to the entire area of the bottom 502" means that, for example, as shown in FIG. 10B, a length L6 of the end 902 of the second stirring member 90 in the horizontal direction (X axis direction) is 70% or more of a length L5 of the bottom 502 of the second liquid container 50. In this embodiment, the length L6 is defined as 75% of the length L5. The above description "in proximity to" means that, in the vertical direction (Z axis direction) in the mounted position, a length L8 (which corresponds to lengths L8*a*, L8*b* of FIG. 10B) extending from the end 902 to the bottom 502 that opposes the end 902 is 30% or less of a length L7 (which corresponds to lengths L7*a*, L7*b* of FIG. 10B) extending from the contact point where the second stirring member 90 is in contact with the projection 314 to the end 902 (the position of the contact point in the vertical direction is indicated by the dashed dotted line TM in the FIG. 10B). In FIG. 10B, the length from the contact point to the first end 902*a* is indicated by L7*a* and the length from the first end 902*a* to the bottommost part of the bottom 502*a* which opposes to the first end 902*a* is indicated by L8*a*. Further, the length from the contact point to the second end 902*b* is indicated by L7*b* and the length from the second end 902*b* to the upper part of the bottom 502*b* which opposes to the second end 902*b* is indicated by L8*b*. It is preferable that the second stirring member 90 is arranged such that a narrow gap is formed between the bottom 502 and the end 902 so as to avoid them from coming in contact with each other, thereby allowing the entire pigment ink in proximity to the bottom 902 to be flown upward with a high certainty.

Figure 11B:
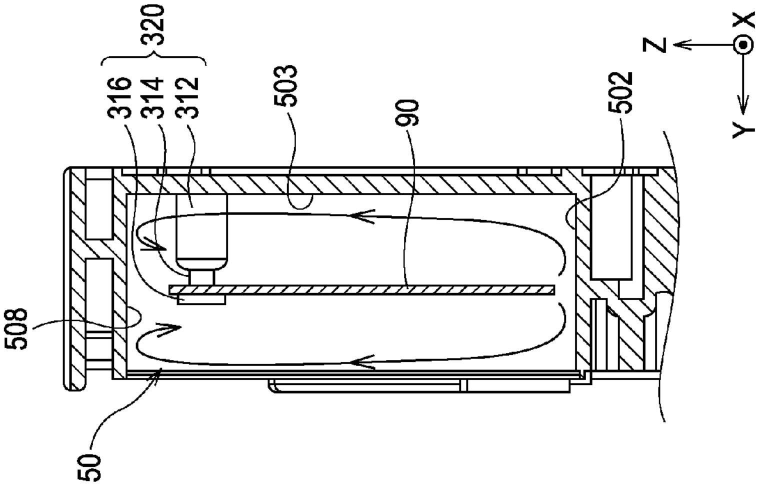
FIGS. 11A and 11B are views explaining a stirring state of the second liquid container.
Figure 11A:
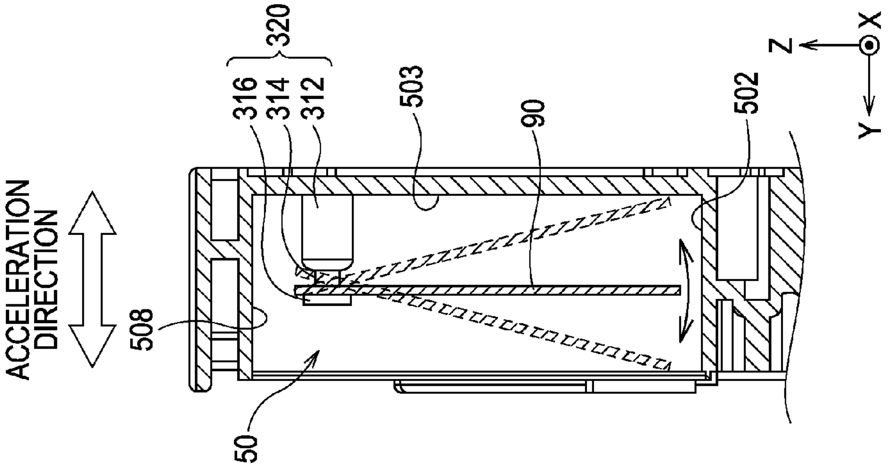

FIG. 11 is a view explaining a stirring state of the second liquid container 50. FIG. 11A is a fragmentary sectional view taken along the line XIA-XIA of FIG. 6, which shows the ink cartridge 10 is mounted in the carriage 12 (FIG. 1) and the carriage 12 is reciprocating (accelerating). FIG. 11B shows the flowing state of the pigment ink in the second liquid container 50, which is caused by acceleration of the carriage 12, as indicated by the arrow. In FIGS. 11A and B, part of the configuration that does not need to be explained is not shown.

As shown in FIG. 11A, when the carriage 12 accelerates to the Y axis direction, the inertia force is applied on the second stirring member 90, thereby causing the second stirring member 90 to be rotated around the projection 314. As a result, the pigment ink in proximity to the bottom 502 is flown upward. That is, as shown in FIG. 11B, the pigment ink is allowed to be flown across the entire area in the second liquid container 50. Accordingly, even if the second liquid container 50 of a horizontally long shape is disposed downstream of the first liquid container 40, it is possible to reduce the variation in the concentration of the pigment ink in the second liquid container 50. That is, even if the second liquid container 50 is disposed, the pigment ink with a uniform concentration can be supplied to the printer 1.

As described above, in this embodiment, the upper container 40*b* contains the pigment ink and a predetermined amount of air (FIG. 7A) in the initial state such that the variation in the concentration of the pigment ink in the first liquid container 40 can be reduced while allowing the first stirring member 80 which is disposed in the first liquid container 40 having a vertically long shape to be more compact.

B. Variations of Embodiments

It should be noted that, among the elements described in the above embodiment, the elements not recited in the independent claims are additional elements and may be eliminated as appropriate. The invention is not limited to the above embodiment or example and can be implemented in various forms within the scope of the invention without departing from its principle. For example, the following variations can be implemented.

B-1. First and Second Variations

Figure 12A:
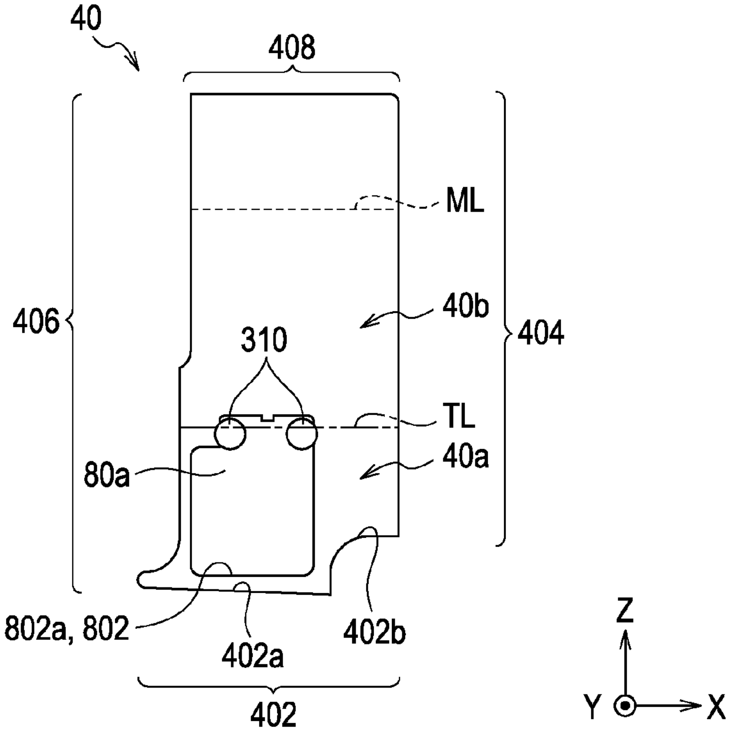
FIGS. 12A and 12B are views explaining first and second variations of embodiments.
Figure 12B:
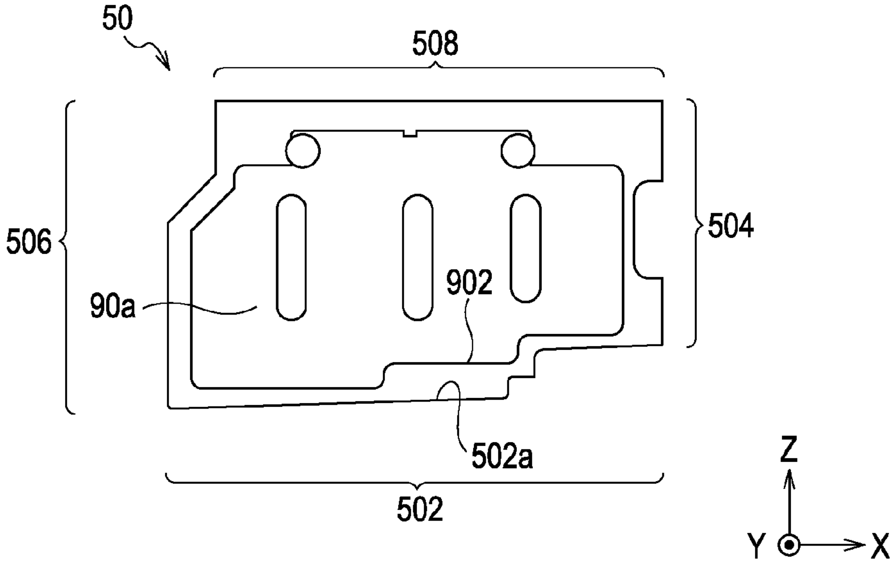

FIG. 12 is a view explaining first and second variations of embodiments. FIG. 12A is a view which explains the first variation and corresponds to FIG. 7B. The first variation differs from the first embodiment in that it has different amount of air contained in the first liquid container 40 and different shape of the first stirring member 80*a* in the initial state. The configuration of the other elements (such as various flow channels formed in the case body 20) is the same as those described above, therefore the same reference numerals are used for similar elements to avoid duplication of description. FIG. 12B is a view which explains the second variation and corresponds to FIG. 10B. The second variation differs from the first embodiment in that it has different shape of the second stirring member 90*a*. The configuration of the other elements (such as various flow channels formed in the case body 20) is the same as those described above, therefore the same reference numerals are used for similar elements to avoid duplication of description.

B-1-1. Specific Description of First Variation

According to the first variation, in the initial state of the ink cartridge 10, the first liquid container 40 contains 20% of the volume of the upper container 40*b*. That is, according to the first variation, the first liquid container 40 contains air of a volume greater than that of the first embodiment in the initial state. The amount of the air contained corresponds to 30% of the volume of the upper container 40*b*. When the amount of the air contained in the initial state is greater than that of the first embodiment, the range of movement of the pigment ink can be increased and the area to be stirred by the first stirring member 80*a* can be reduced. In other words, the greater amount of the air contained in the initial state makes it possible to reduce the variation in the concentration of the pigment ink in the first liquid container 40 while allowing the first stirring member 80*a* to be more compact. Particularly, the dimension in the height direction in the mounted position can be reduced. The amount of the air contained in the initial state is preferably 50% or less of the volume of the first liquid container 40 in order to ensure a certain amount of the pigment ink to be contained.

In the first embodiment, it is described that the end 802 has a shape which generally corresponds to the entire area of the bottom 402 (FIG. 8), however the shape is not limited to this example. For example, as shown in FIG. 12A, the shape may be formed such that it generally corresponds to the entire area of the bottommost part of the bottom 402*a*. With this configuration, the pigment ink having highest concentration at least in the first liquid container 40, which is located in proximity to the bottommost part of the bottom 402*a*, can be stirred, therefore the variation in the concentration of the pigment ink in the first liquid container 40 can be reduced. In addition, in order to further reduce the variation in the concentration of the pigment ink in the first liquid container 40, the surface area of the plate surface of the first stirring member 80 is preferably 50% or more, more preferably 55% or more, of the surface area of the part of the first side 403 (FIG. 7) which is located in the lower container 40*a*. That is, the first stirring member 80 preferably has a shape to cover the part of the first side 403 which is located in the lower container 40*a*.

B-1-2. Specific Description of Second Variation

The second stirring member 90*a* in the second variation is formed such that it covers a part of the second liquid container 50 which is larger than the second stirring member 90 does in the first embodiment. Specifically, it covers 80% of the first side 503 (FIG. 10A). Therefore, when the second stirring member 90*a* covers the larger area of the second liquid container 50, the second stirring member 90*a* can improve the flowability of the pigment ink in the second liquid container 50, thereby enabling the variation in the concentration of the pigment ink in the first liquid container 40 to be further reduced.

B-2. Third Variation

In the first embodiment, it is described that the end 902 of the second stirring member 90 has a shape which generally corresponds to the entire area of the bottom 502 of the second liquid container 50 (FIG. 10B), however the shape is not limited to this example. At least, the end 902 may have a shape such that it corresponds to the entire area of the bottommost part of the bottom 502*a*. With this configuration, the pigment ink having higher concentration, which is located in proximity to the bottommost part of the bottom 502*a*, can be stirred, therefore the variation in the concentration of the pigment ink in the second liquid container 50 can be reduced.

B-3. Fourth Variation

In the first embodiment, the ink cartridge 10 is described as a type which is mounted in the carriage 12 (FIG. 1) (so-called on-carriage type of cartridge), however other types of ink cartridge 10 may be used, such as that is mounted in a mounting section which is formed at a position other than the carriage 12 (so-called off-carriage type of cartridge). When the invention is applied to the off-carriage type cartridge, the pigment ink in the first and the second liquid containers 40 and 50 is stirred by periodically reciprocating (accelerating) the mounting section in a predetermined direction (the direction perpendicular to the stirring member). In addition, as long as the reciprocating motion includes at least a predetermined direction component, it may also include other direction component.

B-4. Fifth Variation

Although the first embodiment has been described by means of the ink cartridge 10 that is used in the printer 1 as an example of the liquid containing chamber, the invention is not limited to this example and also applicable to various liquid containing chambers. Particularly, the invention is advantageously applicable to the liquid containing chambers that contain a dispersion substance. The invention is applicable to a liquid containing chamber that is mounted in, for example, an apparatus having a color material ejecting head such as a liquid crystal display, an apparatus having an electrode material (conductive paste) ejecting head used for forming electrodes for an organic electroluminescence display, a field emission display (FED) and the like, an apparatus having a bioorganic ejection head used for manufacturing biochips, an apparatus having a sample ejection head as a fine pipette, a liquid ejecting apparatus such as a textile printing apparatus, a microdispenser and the like.

When a liquid containing chamber is used in the various liquid ejecting apparatuses as described above, a suitable liquid (such as color material, conductive paste and bioorganic material) may be contained in the liquid containing chamber depending on the type of liquid ejected from the liquid ejecting apparatus.

What is claimed is:

1. A liquid containing chamber configured to be mounted to a liquid ejecting apparatus in a vertical direction and to supply liquid to the liquid ejecting apparatus, the liquid containing chamber comprising:

a liquid supply unit that supplies the liquid to the liquid ejecting apparatus;

a first liquid container of containing the liquid and coupled with the liquid supply unit by a fluid path, the first liquid container having a maximum length in a first direction which is longer than a maximum length in a second direction perpendicular to the first direction, the first direction being the vertical direction when the liquid containing chamber is mounted on the liquid ejecting apparatus and the liquid supply unit is located at a vertically lower position than the first liquid container;

a first projection provided in the first liquid container; and a first stirring member provided in the first liquid container and supported by the first projection so as to be rotatable within a predetermined range of angles to stir the liquid in the first liquid container, the first stirring member comprising a plate extending from the supported position toward a portion of the first liquid container, the portion being a bottom when the liquid containing chamber is mounted on the liquid ejecting apparatus, wherein the first stirring member is rotatable around the first projection by the acceleration of the liquid containing chamber, wherein the first liquid container is divided into a first container portion and a second container portion, the first container portion is an upper container portion located vertically above the first projection and contains the liquid and an amount of air when the liquid containing chamber is mounted on the liquid ejecting apparatus, the air is configured to stir the liquid in the upper container portion, and the second container portion is a lower container portion located vertically below the upper container portion and contains the liquid when the liquid containing chamber is mounted on the liquid ejecting apparatus, a second liquid container coupled with the first liquid container and the liquid supply unit, the second liquid container positioned between the first liquid container and the liquid supply unit, the second liquid container having a horizontally long shape in a mounted position;

a second projection provided in the second liquid container; and a second stirring member supported by the second projection so as to be rotatable within a predetermined range of angles, the second stirring member comprising a plate extending from the supported position toward a bottom of the second liquid container in the mounted position, wherein the first liquid container has an air communication hole for communicating with air, wherein the second stirring member is rotatable around the second projection by the acceleration of the liquid containing chamber, and wherein in an initial state, the second liquid container contains the liquid, and the second stirring member stirs the liquid contained in the second liquid container by rotation of the second stirring member.

2. The liquid containing chamber according to claim 1, wherein an end of the first stirring member opposing the bottom of the first liquid container has a shape which generally corresponds to the bottom of the first liquid container.

3. The liquid containing chamber according to claim 2, wherein the bottom of the first liquid container comprises a bottommost part and an upper part, and wherein the end of the first stirring member has a shape which generally corresponds to the bottommost part and the upper part of the first liquid container bottom, the first stirring member is arranged in the first liquid container such that the end is positioned at least in proximity to the bottom of the first liquid container such that a vertical distance between the end of the first stirring member and the bottom of the first liquid container is 30% or less of a length extending from a contact point where the first stirring member is in contact with the first projection to the end of the first stirring member.

4. The liquid containing chamber according to claim 1, wherein in the initial state, the upper container portion contains air accounting for a volume of 30% or more and 50% or less of the volume of the upper container portion.

5. The liquid containing chamber according to claim 1, further comprising:

a side of the second liquid container which is perpendicular to the bottom of the second liquid container and opposes a plate surface of the second stirring member, wherein the second stirring member has a shape which covers the entire area of the second side when the second stirring member is directly projected on the second side, an end of the second stirring member which opposes the bottom of the second liquid container has a shape which generally corresponds to the bottom of the second liquid container.

6. The liquid containing chamber according to claim 5, wherein the second stirring member is arranged in the second liquid container such that the end of the second stirring member is positioned in proximity to the bottom of the second liquid container such that a vertical distance between the end of the second stirring member and the bottom of the second liquid container is 30% or less of a length extending from a contact point where the second stirring member is in contact with the second projection to the end of the second stirring member.

7. A liquid ejecting apparatus comprising:

a housing including a carriage that reciprocates in a main scan direction perpendicular to the first and second directions, and the liquid containing chamber of claim 1 mounted to the carriage;

wherein the carriage further comprises a recording head for ejecting liquid from the liquid containing chamber.

8. A liquid ejecting apparatus comprising:

a housing including a carriage that reciprocates in a main scan direction perpendicular to the first and second directions, and the liquid containing chamber of claim 2 mounted to the carriage;

wherein the carriage further comprises a recording head for ejecting liquid from the liquid containing chamber.

9. A liquid ejecting apparatus comprising:

a housing including a carriage that reciprocates in a main scan direction perpendicular to the first and second directions, and the liquid containing chamber of claim 3 mounted to the carriage;

wherein the carriage further comprises a recording head for ejecting liquid from the liquid containing chamber.

10. A liquid ejecting apparatus comprising:

a housing including a carriage that reciprocates in a main scan direction perpendicular to the first and second directions, and the liquid containing chamber of claim 4 mounted to the carriage;

wherein the carriage further comprises a recording head for ejecting liquid from the liquid containing chamber.

11. A liquid ejecting apparatus comprising:

a housing including a carriage that reciprocates in a main scan direction perpendicular to the first and second directions, and the liquid containing chamber of claim 5 mounted to the carriage;

wherein the carriage further comprises a recording head for ejecting liquid from the liquid containing chamber.

12. A liquid ejecting apparatus comprising:

a housing including a carriage that reciprocates in a main scan direction perpendicular to the first and second directions, and the liquid containing chamber of claim 6 mounted to the carriage;

wherein the carriage further comprises a recording head for ejecting liquid from the liquid containing chamber.

* * * * *